(12) United States Patent
Middleton et al.

(10) Patent No.: US 6,826,670 B2
(45) Date of Patent: Nov. 30, 2004

(54) ACCESSING MEMORY UNITS IN A DATA PROCESSING APPARATUS

(75) Inventors: Peter Guy Middleton, Saffron Walden (GB); David Michael Bull, Cambridge (GB); Gary Campbell, Corby (GB)

(73) Assignee: ARM Limited, Cambridge (GB)

( * ) Notice: Subject to any disclaimer, the term of this patent is extended or adjusted under 35 U.S.C. 154(b) by 379 days.

(21) Appl. No.: 10/158,105

(22) Filed: May 31, 2002

(65) Prior Publication Data

US 2003/0037217 A1 Feb. 20, 2003

(30) Foreign Application Priority Data

Aug. 14, 2001 (GB) .............................................. 0119845

(51) Int. Cl.$^7$ .............................................. G06F 12/00
(52) U.S. Cl. ........................ 711/205; 711/213; 711/137; 711/154; 711/156; 711/163; 711/204; 713/322; 713/601
(58) Field of Search ................................ 711/205, 213, 711/137, 154, 156, 163, 204; 713/322, 601

(56) References Cited

U.S. PATENT DOCUMENTS

| | | | | | |
|---|---|---|---|---|---|
| 4,912,626 | A | * | 3/1990 | Fiacconi ..................... | 711/124 |
| 5,553,262 | A | * | 9/1996 | Ishida et al. ................. | 711/123 |
| 5,845,309 | A | * | 12/1998 | Shirotori et al. ............... | 711/3 |
| 5,918,250 | A | * | 6/1999 | Hammond .................... | 711/205 |
| 5,918,251 | A | * | 6/1999 | Yamada et al. ............. | 711/207 |
| 5,974,505 | A | * | 10/1999 | Kuttanna et al. ........... | 711/118 |
| 6,006,312 | A | * | 12/1999 | Kohn et al. .................. | 711/210 |
| 6,079,006 | A | * | 6/2000 | Pickett ........................ | 711/213 |
| 6,345,336 | B1 | * | 2/2002 | Takahashi .................... | 711/125 |
| 6,351,797 | B1 | * | 2/2002 | Beard et al. ................. | 711/207 |
| 6,535,959 | B1 | * | 3/2003 | Ramprasad et al. ........ | 711/125 |
| 6,651,156 | B1 | * | 11/2003 | Courtright et al. .......... | 711/207 |
| 6,766,431 | B1 | * | 7/2004 | Moyer ......................... | 711/168 |

OTHER PUBLICATIONS

Malik et al., "A Low Power Unified Cache Architecture Providing Power and Performane Flexibility," pp 241–243, ACM, 2000.*
Panda et al., "Data Memory Organization and Optimizations in Application–Specific Systems," pp 56–68, IEEE, Jun. 2001.*

* cited by examiner

*Primary Examiner*—Stephen Elmore
(74) *Attorney, Agent, or Firm*—Nixon & Vanderhye P.C.

(57) ABSTRACT

The present invention relates to a technique for accessing memory units in a data processing apparatus. The data processing apparatus comprises of plurality of memory units for storing data values, a processor core for issuing an access request specifying an access to be made to the memory units in relation to a data value, and a memory controller for performing the access specified by the access request. Attribute generation logic is provided for determining from the access request one or more predetermined attributes verifying which of the memory units should be used when performing the access. However, the memory controller does not wait until such determination has been performed by the attribute generation logic before beginning the access. Instead, prediction logic is arranged to predict the one or more predetermined attributes, and clock generation logic is responsive to the predictive predetermined attributes from the prediction logic to select which one of the memory units is to be clocked during performance of the access, and to issue a clock signal to that memory unit. Checking logic is then provided to determine whether the predetermined attributes generated by the attribute generation logic agree with the predicted predetermined attributes, and if not, to reinitiate the access, in which event the clock generation logic is arranged to reselect one of the memory units using the predetermined attributes as determined by the attribute generation logic. This approach enables high speed processing of access requests, whilst achieving significant power savings over prior art systems where multiple memory units are clocked speculatively in parallel.

10 Claims, 7 Drawing Sheets

ACCESSING MEMORY UNITS IN A DATA PROCESSING APPARATUS

BACKGROUND OF THE INVENTION

1. Field of the Invention

The present invention relates to techniques for accessing memory units in a data processing apparatus.

2. Description of the Prior Art

A data processing apparatus will typically include a processor core for executing data processing operations. A memory system will then be made available to the processor core for storing data and/or instructions required by the processor core to perform such data processing operations. Hence, the processor core will receive instructions and associated data from the memory system, will execute those instructions, and optionally will output data for storing back in the memory system. Hereafter, the term "data value" will be used to refer to both instructions and data. When a data value is to be transferred to/from the memory system, the processor core will issue an access request specifying that transfer.

A typical memory system will include a main memory, also referred to herein as an external memory, which can store the data values required by the processor core. However, the retrieval of data values from that main memory, and the writing of data values back to that main memory, is typically a relatively slow process, and accordingly it is known to provide one or more memory units in addition to the main memory within the memory system. A well-known example of such an additional memory unit is a cache, which can be used to store data values retrieved from the main memory, and/or data values output by the processor core, so that those data values are readily available to the processor core if required for subsequent data processing operations. It will be appreciated by those skilled in the art that there are a number of well-known techniques for determining which data values get stored within the cache, and which data values get evicted from the cache when new data values need storing within the cache. However, fundamentally, the cache is typically relatively small compared to the main memory, is significantly quicker to access than the main memory, and is aimed at temporarily storing data values that are likely to be needed by the processor core.

The memory system may include a single cache, or alternatively may contain a plurality of caches arranged, for example, in a hierarchical structure.

In addition, another type of memory unit that may be included within the memory system is a tightly-coupled memory (TCM), which is typically connected to the processor bus on which the processor core issues access requests, and is used to store data values for which a deterministic access time is required. The TCM presents a contiguous address space to a programmer, which can be used to store data values, and hence, as an example, a particular portion of code for which a deterministic access time is important can be stored directly in the TCM. The TCM can be used as if it were a particular portion of the main memory (i.e. the data values in the TCM are not replicated in the main memory), or alternatively the data values to be placed in the TCM can be copied from the main memory. Typically, a register somewhere within the data processing apparatus will keep a record of the address range of data values placed in the TCM so that it can be determined whether a particular data value the subject of an access request by the processor core will be found in the TCM or not. The TCM may be embodied in any appropriate form, for example, Random Access Memory (RAM), Read Only Memory (ROM), etc.

In a data processing apparatus of the above type, where the memory system comprises a plurality of memory units, an access request issued by a processor core is typically analysed to determine which memory unit should be used to perform the access. For example, if the access request relates to a read of a data value, and the address issued as part of the access request relates to a cacheable area of memory, then it is appropriate to access the cache to determine whether that data value is present in the cache. If it is, then the data value can be returned directly to the processor core, whereas if it is not, then typically a linefill procedure will be invoked to read a number of data values, including the data value of interest, from external memory, and to then place those retrieved data values in a line of the cache.

Similarly, if having reference to the register storing the address range of data values stored in the TCM, it is determined that the data value resides in the TCM, then it is clearly appropriate to access the TCM to retrieve the data value required by the processor core.

However, to achieve desired performance levels for performing accesses, there is not typically sufficient time to wait for the above-described analysis of the access request to be completed before the access to the appropriate memory unit is initiated. Instead, for performance reasons, it is typically required to simultaneously perform the access to multiple of the memory units, so that by the time the analysis of the access request has taken place, and the appropriate memory unit to access has hence been determined, that memory unit is already in a position to complete the access (for example by outputting the desired data value to the processor core for a read request, or storing the required data value for a write request). Further, any output generated by the other memory units that have been accessed, but which in hindsight need not have been, can be ignored.

For example, if a cache lookup took place and resulted in a cache miss, but the results of the analysis of the access request indicated that the data value was in a non-cacheable region of memory, then the fact that the cache miss occurred can be ignored, rather than invoking the usual procedure of performing a linefill to the cache. Similarly, if the address specified by the access request is outside of the range of the addresses stored within the TCM, then the TCM will still typically generate an output based on that portion of the address which is within the range of addresses for data stored within the TCM. However, once the analysis of the access request indicates that the data value is not within the TCM, that output from the TCM can be ignored.

Whilst from a performance point of view the above approach of speculatively accessing multiple memory units, and then qualifying their outputs based on the results of the analysis of the access request, enables the required performance for accesses to be achieved, such an approach consumes significant power, since more memory units are accessed that actually is required to perform the access request issued by the processor core. For example, in a system employing a cache and a TCM, if the access request actually specifies a data value contained within the TCM, then the cache will unnecessarily have been driven to perform an access, whilst similarly if the access request relates to a cacheable data value, the TCM will unnecessarily have been driven to perform the access.

Accordingly, it would be desirable to provide a more power efficient technique for performing memory accesses, which does not unduly impact performance.

SUMMARY OF THE INVENTION

Viewed from a first aspect, the present invention provides a data processing apparatus, comprising: a plurality of memory units for storing data values; a processor core for issuing an access request specifying an access to be made to the memory units in relation to a data value; a memory controller for performing the access specified by the access request; attribute generation logic for determining from the access request one or more predetermined attributes verify which of the memory units should be used when performing the access; prediction logic for predicting the one or more predetermined attributes; clock generation logic responsive to the predicted predetermined attributes from the prediction logic to select which one of the memory units is to be clocked during performance of the access, and to issue a clock signal to that memory unit; checking logic for determining whether the predetermined attributes generated by the attribute generation logic agree with the predicted predetermined attributes, and if not, for reinitiating the access, in which event the clock generation logic is arranged to reselect one of the memory units using the predetermined attributes as determined by the attribute generation logic.

Hence, in accordance with the present invention, attribute generation logic is provided to determine from an access request one or more predetermined attributes identifying which of the memory units should be used to perform the access. However, for performance reasons, the memory controller begins to perform the access specified by the access request without waiting for the attribute generation logic to finish its determination. However, in contrast to the earlier described prior art technique, the access is not speculatively performed across multiple memory units, but instead prediction logic is provided to predict the one or more predetermined attributes, and clock generation logic is provided that is responsive to the predicted predetermined attributes to select which one of the memory units to clock during performance of the access, and to issue a clock signal to that memory unit. Accordingly, taking the earlier example of a data processing apparatus that includes a cache and a TCM, if the predicted predetermined attributes indicate that the access request relates to a cacheable data value, then the cache will be clocked, but the TCM will not.

In accordance with the present invention, the data processing apparatus also includes checking logic which, once the attribute generation logic has determined the predetermined attributes, is arranged to determine whether those predetermined attributes agree with the predicted predetermined attributes. If they do, then no action is required, as the access will have been performed correctly based on the predicted predetermined attributes. However, if the predetermined attributes do not agree with the predicted predetermined attributes, the access is reinitiated, in which the event the clock generation logic is arranged to reselect one of the memory units using the predetermined attributes rather than the predicted predetermined attributes.

Accordingly, it can be seen that the present invention, when used with a reasonably accurate prediction scheme, reduces power consumption by avoiding parallel accesses to multiple memory units, at the expense of a relatively small loss in performance due to occasional misprediction of the memory unit to be accessed.

It is possible for the data processing apparatus to include a generic memory controller for controlling accesses to any of the plurality of memory units. However, in preferred embodiments, the memory controller comprises a plurality of memory controllers, each memory controller being associated with a different memory unit, and the clock generation logic is arranged to clock the selected memory unit and its associated memory controller during performance of the access. With such an approach, it is possible not only to save power by not clocking any memory units other than the one indicated by the predicted predetermined attributes, but additionally power can be saved by not clocking any of the associated memory controllers for those non-clocked memory units.

It will be appreciated that the predetermined attributes can take a variety of forms, and may be determined in a number of different ways. However, in preferred embodiments, the access request specifies an address relating to the data value, and the attribute generation logic is arranged to determine the predetermined attributes dependent on the address. In such embodiments, it will be apparent that the address need not be used in isolation to determine the predetermined attributes, but may be used in combination with other information, such as the TCM region register settings, page table attributes, etc.

It will be apparent that the present invention may be utilised in any apparatus in which multiple memory units are used. However, in preferred embodiments, a first memory unit is tightly coupled memory for storing data values to which the processor core requires deterministic access. TCMs are typically relatively large compared with caches, and hence consume more power to clock speculatively as is done in the earlier described prior art techniques. Accordingly, in embodiments where one of the memory units is a TCM, significant power savings can be made by employing the techniques of the preferred embodiment of the present invention.

Furthermore, in preferred embodiments, a second memory unit is a cache.

It will be appreciated that the attribute generation logic may take a variety of forms. However, in preferred embodiments, the attribute generation logic is contained within a memory management unit (MMU) arranged to generate for each access request a number of attributes including the predetermined attributes. Typically, the data processing apparatus will already include an MMU, the MMU being responsible for analysing access requests in order to generate certain attributes, for example a physical address assuming the address output by the processor core is a virtual address, an indication as to whether the data value is cacheable, an indication as to whether the data value is bufferable, etc. By arranging the MMU to include within the attributes that it produces the predetermined attributes required in preferred embodiments of the present invention, a particularly efficient embodiment can be realised, since use is made of the pre-existing circuitry of the MMU.

In preferred embodiments, the MMU comprises a table lookaside buffer for comparing an address specified by the access request with predetermined addresses in the table lookaside buffer, for each predetermined address the table lookaside buffer containing the number of attributes needing to be generated by the MMU. Hence, in this embodiment, the attributes, including the predetermined attributes required in accordance with preferred embodiments of the present invention, are precoded into the table lookaside buffer, such that they can be output directly when an address match is determined by the table lookaside buffer. In an alternative embodiment, additional circuitry may be provided to generate the predetermined attributes from the attributes generated by a standard table lookaside buffer of an MMU.

It will be appreciated that there are a number of different ways in which the clock generation logic can be arranged to selectively provide clock signals to the various memory units dependent on the predicted predetermined attributes and/or the actual predetermined attributes from the attribute generation logic. However, in preferred embodiments, the checking logic is arranged to generate a mispredict signal if the predetermined attributes do not agree with the predicted predetermined attributes, and the clock generation logic comprises clock signal gating circuitry for each memory unit, each clock signal gating circuitry receiving a system clock signal and outputting that system clock signal to the associated memory unit if either the predicted predetermined attributes indicate that the associated memory unit should be used for the access, or the mispredict signal is generated and the actual predetermined attributes generated by the attribute generation logic indicate that the associated memory unit should be used for the access.

It will be appreciated that the prediction logic can take a variety of forms, dependent on the prediction scheme used. Further, it will be appreciated that there are many different known prediction schemes, and any suitable prediction scheme can be used to predict the predetermined attributes. However, in preferred embodiments, the prediction logic bases the predicted predetermined attributes for a current access request on the actual predetermined attributes generated by the attribute generation logic for a preceding access request. It has been found that this provides reliable prediction in preferred embodiments of the present invention, since the processor core often issues a series of access requests relating to data values stored in the same memory unit Viewed from a second aspect, the present invention provides a method of accessing memory units in a data processing apparatus, the data processing apparatus comprising a plurality of memory units for storing data values, a processor core for issuing an access request specifying an access to be made to the memory units in relation to a data value, and a memory controller for performing the access specified by the access request, the method comprising the steps of: a) determining from the access request one or more predetermined attributes verifying which of the memory units should be used when performing the access; b) prior to completion of said step (a), performing the steps of: (i) predicting the one or more predetermined attributes; (ii) responsive to the predicted predetermined attributes generated at said step (b)(i), selecting which one of the memory units is to be clocked during performance of the access; (iii) issuing a clock signal to the memory unit selected at said step (b)(ii); and (iv) causing the memory controller to perform the access; c) once the determination at said step (a) is completed, determining whether the predetermined attributes generated at said step (a) agree with the predicted predetermined attributes generated at said step (b)(i), and if not, reinitiating the access, in which event one of the memory units is selected using the predetermined attributes determined at said step (a), a clock signal is issued to that memory unit, and the memory controller then reperforms the access.

BRIEF DESCRIPTION OF THE DRAWINGS

The present invention will be described, further by way of example only, with reference to a preferred embodiment thereof as illustrated in the accompanying drawings, in which.

DESCRIPTION OF A PREFERRED EMBODIMENT

Figure 1:
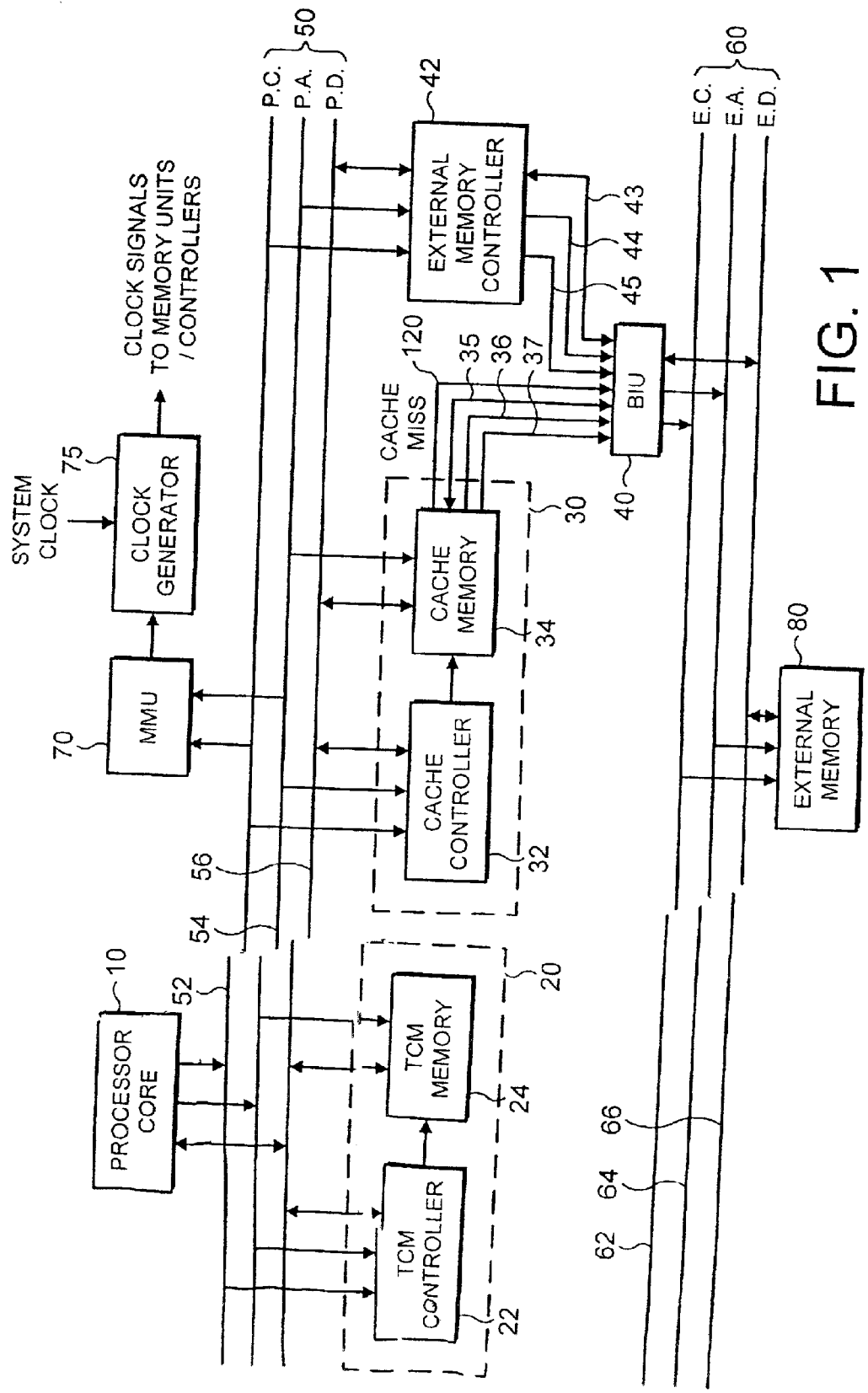
FIG. 1 is a block diagram illustrating elements of a data processing apparatus in accordance with preferred embodiments of the present invention.

A data processing apparatus according to a preferred embodiment of the present invention will be described with reference to the block diagram of FIG. 1. As shown in FIG. 1, the data processing apparatus has a processor core 10 arranged to process instructions received from the memory system 20, 30, 80. Data required by the processor core 10 for processing those instructions may also be retrieved from the memory system. It will be appreciated that these "data values", whether they be instructions or data, may be of any appropriate size, for the purposes of the preferred embodiment description it being assumed that each data value is 32 bits in size.

In a typical implementation, the data values required by the processor core 10 will be placed in the external memory 80. In addition, a cache 30 is provided for storing data values retrieved from the memory 80 so that they are subsequently readily accessible by the processor core 10. A cache controller 32 controls the storage of data values in the cache memory 34 of the cache 30 and controls the retrieval of the data values from the cache memory 34.

In preferred embodiments, the cache 30 is coupled to the processor core 10 directly via the processor bus 50, and provides relatively quick access to the subset of data values stored within the cache memory 34, rather than requiring those data values to be retrieved from the external memory 80 via the bus interface unit 40. The main aim of the cache is to temporarily store data values that are likely to be needed by the processor core, and as will be appreciated by those skilled in art, there are many known techniques for determining which data values are stored within the cache memory 34.

Whilst the cache 30 is an efficient mechanism for providing relatively quick access to a subset of data values, it does not ensure a deterministic access time for any particular data value, since there is no guarantee that any particular data value will be stored in the cache memory 34 at any particular point in time. Whilst it is possible to lock down certain data values within the cache memory 34 so as to provide some form of deterministic access for those data values, this is a relatively inefficient way of operating the cache, as it adversely impacts the flexibility of the cache to alter its contents dynamically.

Accordingly, to provide deterministic access for particular data values, it is known to provide a tightly-coupled memory (TCM) 20 consisting of a TCM memory 24, and a TCM controller 22 to control the storage of data values into the TCM memory 24 and the retrieval of those data values from the TCM memory 24. Preferably, the TCM is coupled to the processor core 10 directly via the processor bus 50. The TCM presents a contiguous address space to a programmer, and can be seen to replicate, or replace a particular portion of the main memory 80. Accordingly, a particular portion of code for which deterministic access is important can be stored directly in the TCM 20.

When the processor core 10 wishes to perform a data transfer, whether that be the reading of a data value from the memory system, or the writing of a data value to that memory system, it initiates an access request by placing an address for the data value on processor address bus 54, and a control signal on control bus 52. In addition, if the access request relates to a write, then the data value to be written to the memory system is placed on the data bus 56. The signal output on the control bus includes information such as whether the access request specifies an instruction or data, a read or write request, and whether the data being transferred is a word, half word or byte.

It will be appreciated that within a system such as that illustrated in FIG. 1, where multiple separate memory units are provided for storing data values, a determination need to be made as to which memory unit should be accessed to process the access request. This job is performed by the Memory Management Unit (MMU) 70, which receives the control and address signals output by the processor core 10 on bus 50, and based on that information generates a number of attributes used to control the access request. For example, if the address output by the processor core 10 is a virtual address, the MMU 70 will produce a physical address which can for example be used by the bus interface unit (BIM) 40 if the data value needed to be written to, or read from, external memory 80. This physical address can also be routed to the TCM 20 if the TCM memory 24 is arranged using physical rather than virtual addresses. It could also be routed to the cache memory 30 if required, i.e. if the cache memory is physically addressed. In preferred embodiments, the cache 30 uses virtual addresses to identify the data values stored within the cache memory 34 and so the physical address generated by the MMU is not required by the cache.

In addition, the MMU 70 will produce a number of other attributes, for example a cacheable attribute indicating whether the data value comes from a cacheable area of memory, which is used to determine whether the cache 30 should be accessed to perform the access request. Similarly, the MMU 70 will typically produce a bufferable attribute which can be used by the BIU 40 to determine how a write access request should be handled, it being important to know at that stage whether the data value can be buffered within the BIU 40, or whether it must be output immediately to the external memory 80 for storage. In systems that employ a TCM 20, there will typically be a register somewhere within the apparatus identifying the address range of data values stored within the TCM memory 24. In such embodiments, the MMU can be arranged to compare the address of the access request with the addresses in that register to determine whether the TCM 20 should be accessed to process the access request, and to issue an appropriate signal to the TCM 20 based on that comparison.

This analysis of the access request by the MMU 70 takes a significant amount of time, and given the general requirement for high speed processing of access requests by the data processing apparatus, it is not normally possible to wait for that analysis to have been completed by the MMU 70 before the memory system 20, 30, 80 begins processing the access request. Accordingly, the known prior art systems have tended to drive the multiple memory units of the memory system speculatively in parallel whilst the analysis of the access request is being performed by the MMU 70, such that the output from the relevant memory unit can be provided as soon as the analysis by the MMU 70 has been completed.

As an example, when the processor core 10 requires to read a data value, it will initiate an access request by placing an address for the data value on processor address bus 54 and a control signal on control bus 52. In such prior art systems, the cache 30 will, without waiting for the analysis by the MMU 70 to be completed, retrieve the control and address signals from the processor bus 50, and compare the address with the addresses of data values stored within the cache memory 34 to determine whether the required data value is stored within the cache, such that if the data value is stored within the cache, the cache is ready to output the data value onto the processor data bus 56 assuming the result of the analysis by the MMU 70 confirms that the access request relates to a cacheable data value. If the data value corresponding to the address is not within the cache, then the cache memory 34 will send a cache miss signal over path 120 to the BIU 40 to inform the BIU that the data value needs to be retrieved from memory 80. In preferred embodiments, the cache will also in such situations provide the control and address information to the BIU over paths 37, 36, respectively, to enable the BIU to output appropriate signals to the external memory 80 over the external bus 60 to enable the data value to be retrieved.

In an analogous manner, the TCM 20 will also retrieve the control and address information from the processor bus 50, and will perform a look up within the TCM memory 24 based on the address so that it is in a position to output the appropriate value from the TCM memory 24 assuming the analysis from the MMU 70 identifies that the data value is indeed within the TCM memory 24.

In parallel, the external memory controller 42 will retrieve the address and control signals from the processor bus 50 so that it is in a position to perform the access request via the BIU 40 if required. If required, it can then pass the control and address signals over paths 45, 44, respectively, to the BIU 40 to initiate a read of the data value from the external memory 80. For a read request, should there be a cache miss, then the BIU will initiate a read from memory 80 assuming that the results of the analysis from the MMU 70 confirm that the data value is cacheable, and the access request is not aborted by the MMU. More particularly the BIU will pass the address signal received from the cache onto the external address bus 64, and place an appropriate control signal onto bus 62. The memory 80 will determine from the control signal on bus 62 that a memory read is required and will then output on the data bus 66 the data value at the address indicated on address bus 64. The BIU 40 will then pass the data value from data bus 66 to the cache over path 35 so that it can be stored in the cache memory 34. The BIU 40 will also pass the retrieved data value to the external memory controller 42 over path 43, from where it will be output onto the processor data bus 56 for reading by the processor core 10. Subsequently, that data value can readily be accessed directly from the cache 30 by the processor core 10.

As will be appreciated by those skilled in the art, the cache memory 34 typically comprises a number of cache lines, each cache line being arranged to store a plurality of data values. When a data value is retrieved from memory 80 for storage in the cache memory 34, then in preferred embodiments a number of data values are retrieved from memory in order to fill an entire cache line, this technique often being referred to as a "linefill".

From the above description, it will be apparent that with the known prior art technique, a number of access procedures are initiated in parallel within the memory system for each access request issued by the processor core 10 in order to ensure the required performance for access requests is met. More particularly, a lookup in TCM 20 is performed in parallel with a lookup in cache 30, whilst the external memory controller 42 primes itself to perform an access to external memory 80 via the BIU 40 if required.

It will be appreciated that this technique wastes power, as more memory units are driven for each access request than are actually required to perform the access request.

In accordance with preferred embodiments of the present invention, this power consumption problem is alleviated by arranging the MMU 70 to provide predicted versions of certain attributes prior to those attributes actually being determined, and for those predicted attributes to be used by a clock generator 75 such that the system clock is only provided to a subset of the available memory units for any particular access, thereby conserving power. In preferred embodiments, the clock generator is arranged such that it uses the predicted attributes to generate a clock signal to only one of the available memory units, and its associated memory controller. The manner in which this is achieved in preferred embodiments will be described in more details with reference to FIGS. 2 to 6.

Figure 2:
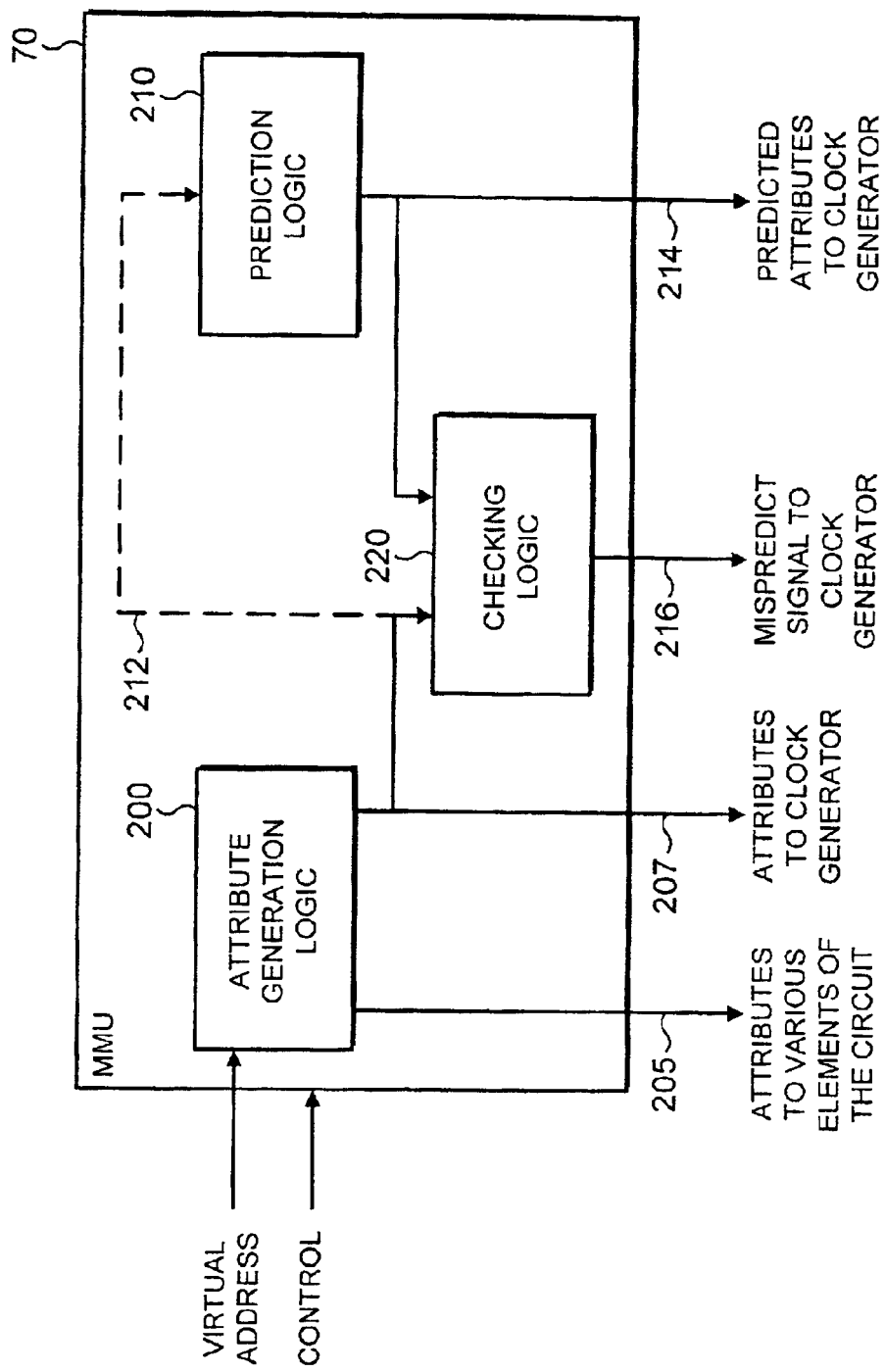
FIG. 2 is a block diagram schematically illustrating elements provided within the MMU in accordance with preferred embodiments of the present invention.

FIG. 2 illustrates in more detail the main elements provided within the MMU 70 in accordance with preferred embodiments of the present invention. The control signal from the processor control bus 52 is provided to the MMU 70 and used by the MMU to perform some standard MMU functions not pertinent to the power saving aspect of preferred embodiments of the present invention. The address output by the processor core 10 on the address bus 54 (here assumed to be a virtual address) is input to the attribute generation logic 200 within the MMU 70. The attribute generation logic 200 is arranged to determine a number of attributes based on the virtual address and to output certain of those attributes over path 205, and certain of those attributes over path 207.

Figure 3A:
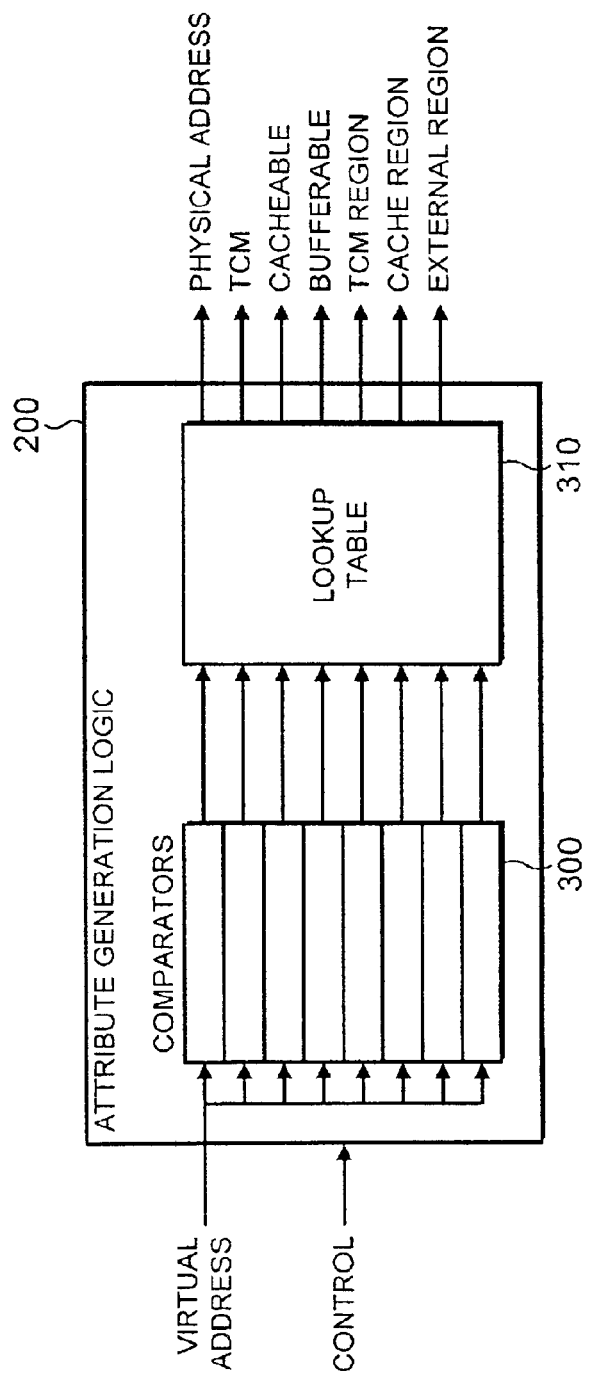
FIG. 3A illustrates a first embodiment of the attribute generation logic illustrated in FIG. 2.

FIG. 3A illustrates one embodiment of the attribute generation logic 200 of preferred embodiments. In this embodiment, the attribute generation logic 200 is formed as a standard table lookaside buffer, where a bank of comparators 300 is provided to compare the virtual address received with predetermined addresses, and to provide output signals to a lookup table indicative of whether a match has been detected by those comparators. Typically, at most there will only be a hit signal generated by one of the comparators and the lookup table 310 will use that hit signal to access a particular entry within the lookup table, where a number of attributes are defined. Those attributes will then be output from the lookup table over paths 205 and 207. As will be appreciated by those skilled in the art, a typical prior art MMU will be arranged to generate the physical address, cacheable and bufferable attributes, and may optionally generate the TCM attribute if the memory system includes a TCM 20. These signals will typically be output over path 205 to various element within the data processing circuit, this being entirely standard in the field of MMUs. However, in preferred embodiments, the lookup table 310 is directly precoded with three additional attributes used in preferred embodiments of the present invention, these being denoted in FIG. 3A as the attributes TCM region, cache region and external region. These signals will in preferred embodiments be output over path 207 to the clock generator 75, where they are used to control the generation of clock signals to the various memory units.

It will be appreciated by those skilled in the art that these additional three attributes can be readily determined from the other attributes already coded into the lookup table. As such, they can either be precoded into the lookup table 310 as shown in the embodiment of FIG. 3A, or alternatively additional circuitry can be included within the attribute generation logic as illustrated in FIG. 3B to generate these additional attributes from the attributes already produced by a standard lookup table 320.

Figure 3B:
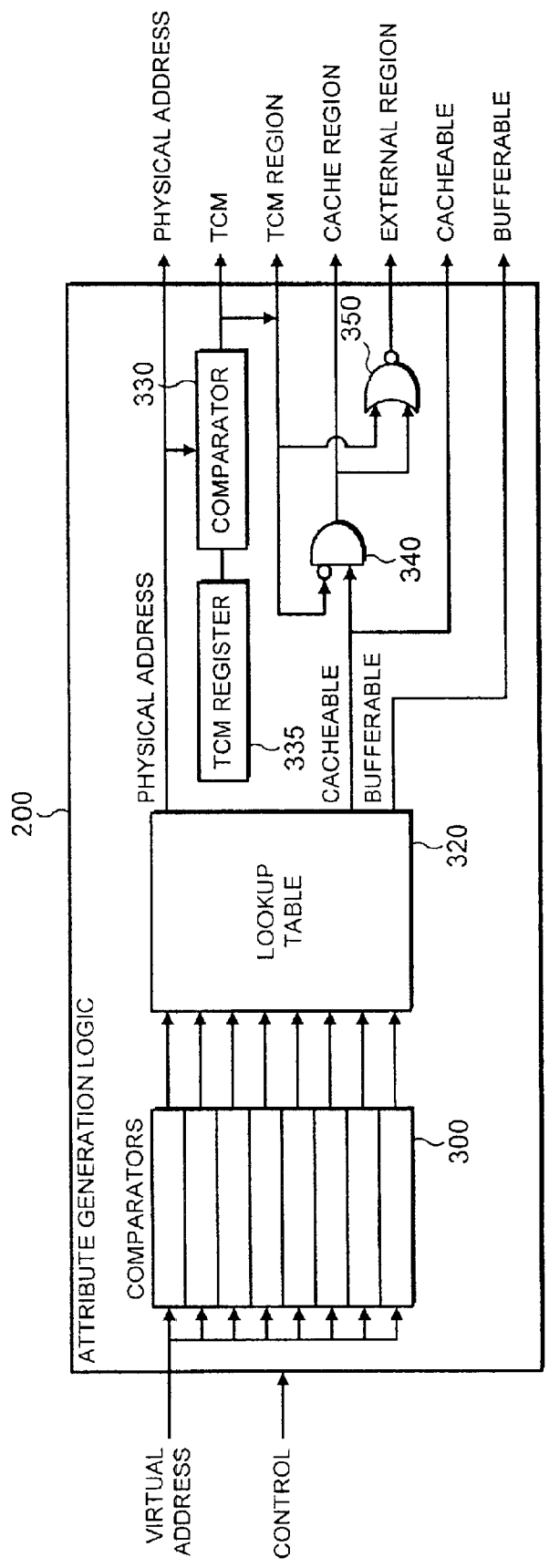
FIG. 3B illustrates an alternative embodiment of the attribute generation logic illustrated in FIG. 2.

As shown in FIG. 3B it is assumed that the lookup table 320 generates three attributes, namely physical address, cacheable and bufferable attributes. As discussed earlier, a TCM attribute can readily be determined by comparing the physical address (associated with the access request) with the contents of a TCM register 335 identifying the range of addresses of data values stored within the TCM memory 24. This may be precoded in the lookup table 320 or alternatively a comparator 330 can be provided to compare the physical address output by the lookup table 320 with the address range specified by the TCM register 335. The TCM attribute generated by the comparator 330 will typically be a one bit value identifying whether the data value will or will not be found within the TCM memory 24. In such embodiments, a TCM region attribute can be readily generated by just replicating the TCM attribute, as illustrated in FIG. 3B.

In preferred embodiments, the cache region attribute is based on the cacheable attribute, but is further qualified by the TCM region attribute. In particular, assuming the TCM region attribute is set to a logic one value to identify that the data value is within the TCM, a negated version of the TCM region signal is input to AND gate 340, along with the cacheable attribute (in preferred embodiments the cacheable attribute being a logic one value if the data value is deemed cacheable). As will be appreciated by those skilled in the art the cache region attribute represented by the output of AND gate 340 will then be set to a logic one value if the data value is deemed cacheable, and is not deemed to be within the TCM.

In preferred embodiments, the TCM region and cache region signals are output to NOR gate 350, whereby the external region attribute represented by the output of NOR gate 350 is set to a logic one value if neither the TCM region attribute nor the cache region attribute is set to a logic one value. It will be appreciated that the logic illustrated in FIG. 3B is just one example of suitable logic for generating the various attributes, and that multiple different arrangements of logic could be used. In particular, if each attribute is "set" to a logic zero value, rather than a logic one value, then it will be appreciated by those skilled in the art that the logic gates 340, 350 would need to be altered.

It will also be appreciated by those skilled in the art that table lookaside buffers (TLBs) can be arranged in a variety of ways. For example, one large TLB could be provided, with a relatively large number of comparators in the bank 300. Alternatively, a common approach is to provide a micro-TLB with a limited number of comparators, and associated entries in the lookup table, and in the event of no hit signal being generated by any of the comparators, to then perform a lookup process in a larger TLB in order to retrieve to the micro-TLB the required address and its associated entries for the lookup table. This level of complexity has been omitted from FIG. 3A and FIG. 3B, but it will be appreciated by those skilled in the art that the attribute generation logic 200 could be formed as a single TLB, or by a combination of a micro-TLB and a larger TLB.

The time taken by the attribute generation logic 200 to generate the above-described attributes is such that the signals output on paths 205 and 207 will not typically be available in the same cycle that the address is issued by the processor core. Accordingly, referring back to FIG. 2, in preferred embodiments prediction logic 210 is provided which is arranged to provide over path 214 to the clock generator 75 predicted versions of the TCM region, cache region and external region attributes during the same clock cycle as the address is issued by the processor core, the clock generator 75 then using these signals to determine which memory unit to clock to perform the access. As discussed earlier, it will be appreciated that the prediction logic can take a variety of forms, dependent on the prediction scheme to be used. It will also be appreciated that there are a multitude of different prediction schemes that could be used to predict these attributes. However, in preferred embodiments, an access request output by the processor core 10 will typically be related to the previous access request, for example specifying an access request to an address which has been incremented with respect to the address of the previous access request. Since the TCM memory 24 presents a contiguous address space to the programmer and since the cache memory 34 typically stores a cache line of data values relating to sequential addresses, then it is likely that for any particular access, the relevant memory unit to access is that used for the preceding access. Accordingly, in preferred embodiments, as illustrated by dotted line 212 in FIG. 2, the prediction logic 210 uses the actual attributes generated by the attribute generation logic 200 over path 207 for a preceding access request to determine the predicted attributes output over path 214 for a current access request. In preferred embodiments, the predicted TCM region, cache region and external region attributes are identical to the actual TCM region, cache region and external region attributes generated by the attribute generation logic 200 for the preceding access request.

In preferred embodiments, the predicted attributes output over path 214 are also passed to checking logic 220, where they are buffered until the actual attributes generated by the attribute generation logic 200 are output over path 207, and received by the checking logic 220. At this stage, the checking logic 220 then compares the actual attributes received over path 207 with the predicted attributes output over path 214, this resulting in a mispredict signal being output by the checking logic 220 over path 216 if there is any difference in the predicted attributes and the actual attributes. It will be appreciated that the checking logic 220 can be embodied in a variety of ways. However, one sample embodiment of the checking logic is illustrated in FIG. 4.

Figure 4:
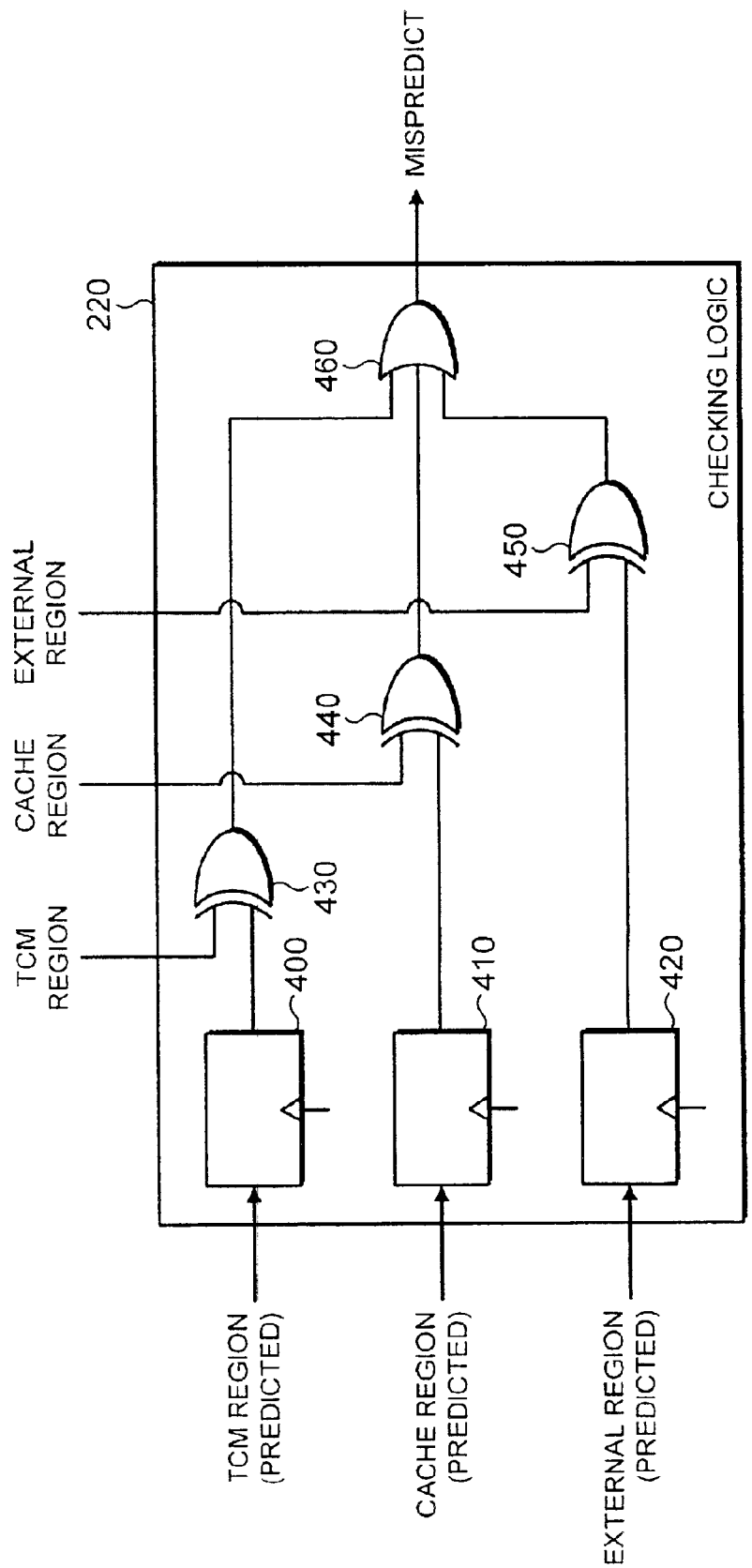
FIG. 4 is a diagram illustrating the construction of the checking logic of FIG. 2 in accordance with preferred embodiments of the present invention.

As can be seen in FIG. 4, registers 400, 410, and 420 are arranged to received the predicted TCM region, cache region and external region attributes, respectively. Here, they are buffered for one clock cycle whereafter they are output to respective exclusive OR (XOR) gates 430, 440, 450. At this time, the XOR gates will also receive as their other input the actual TCM region, cache region and external region attributes, respectively, as generated by the attribute generation logic 200. As will be appreciated by those skilled in the art, an XOR gate is arranged to output a logic one value only if its inputs differ, and accordingly a logic one value output by any of the XOR gates 430, 440, 450 will indicate that the prediction has been incorrect. Accordingly, the outputs from XOR gates 430, 440 and 450 are input to an OR gate 460, and the output of that OR gate is used as the mispredict signal. Accordingly, a logic one value of the mispredict signal will indicate that the prediction has been in error.

Figure 5:
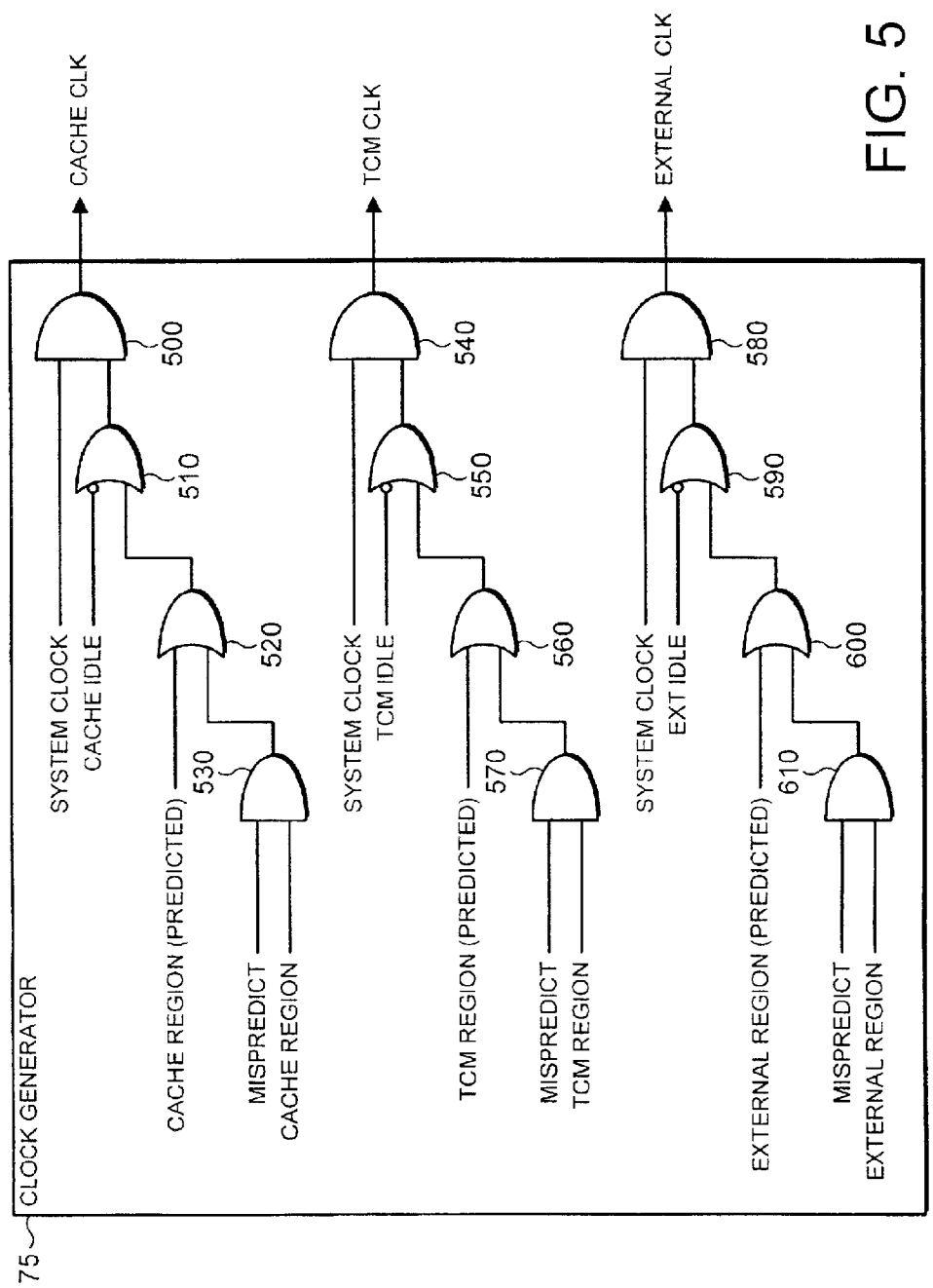
FIG. 5 illustrates the construction of the clock generator of preferred embodiments of the present invention.

The operation of the clock generator 75 will now be discussed in more detail with reference to FIG. 5.

In preferred embodiments, the clock generator 75 includes clock signal gating circuitry for each memory unit, and accordingly based on the system clock will generate three separate output clock signals, namely a cache clock to the cache 30, a TCM clock to the TCM 20, and an external clock to the external memory controller 42.

When a particular memory unit is in an idle state, it will issue a corresponding idle signal which is used to turn off the clock to the corresponding memory unit. This function is performed by the OR gate 510, in combination with the AND gate 500, for the cache, the cache idle signal having a logic one value when the cache is idle, and an inverted version of the cache idle signal being input to the OR gate 510. As such, assuming that the other input to the OR gate is also at a logic zero value, the output from the OR gate will be at a logic zero value, which will ensure that the output from the AND gate 500 is at a logic zero value. As can be seen from FIG. 5, identical circuit elements are also provided to drive the TCM clock signal and the external clock signal.

Considering again as an example the circuitry used to drive the cache clock, it can be seen that OR gate 510 also receives as an input the output from OR gate 520. The OR gate 520 receives as input the predicted cache region attribute, and the output of AND gate 530. The AND gate 530 receives the mispredict signal from the checking logic 220 and the cache region attribute output by the attribute generation logic 200 over path 207 (see FIG. 2). Accordingly, it can be seen that if the prediction logic 210 issues a predicted cache region attribute at a logic one value indicating that the cache should be used to perform the access request, then this logic one value will be output by OR gate 520, and subsequently by OR gate 510, thereby causing the AND gate 500 to generate a cache clock signal at a logic one value, thereby causing the cache 30 to be clocked to perform the memory access.

In preferred embodiments, as was illustrated by FIG. 3B, only one of the TCM region, cache region and external region attributes can be set to a logic one value at any one time, and this constraint also applies to the predicted versions of those signals. Accordingly, assuming the predicted cache region attribute is set to a logic one value, the predicted TCM region and predicted external region attributes will be set to a logic zero value. Furthermore, at this stage, the mispredict signal will be set to a logic zero value, and accordingly it can be seen from FIG. 5 that at this point in time neither the TCM clock or the external clock will be set if the cache clock is set. This ensures that only one memory unit is driven in response to the predicted attributes, thereby conserving power.

Considering the above example further, if it is subsequently determined that the prediction was wrong, and in fact the TCM should be used to perform the access, then it will be appreciated that the checking logic 220 will produce a logic one mispredict signal, and the actual TCM region attribute will be set to a logic one value (the actual cache region and actual external region attributes being set to a logic zero value). This will mean that AND gate 570 will produce a logic one output, whilst AND gates 530 and 610 will produce a logic zero output. The logic one value output by the AND gate 570 will be passed through OR gates 560 and 550, thereby causing the AND gate 540 to generate a TCM clock signal to the TCM 20 to cause the access to be reinitiated by the TCM 20.

It is not critical to the generation of the TCM clock signal that the predicted cache region attribute is reset.

Accordingly, it is envisaged that there may be a short period of time during which both the cache clock and the TCM clock are driven, but that shortly thereafter the predicted cache region will be re-evaluated based on the newly issued actual attributes and accordingly will be set to a logic zero value in preferred embodiments, thereby causing the cache clock signal to be stopped once the cache idle signal has been set.

Figure 6:
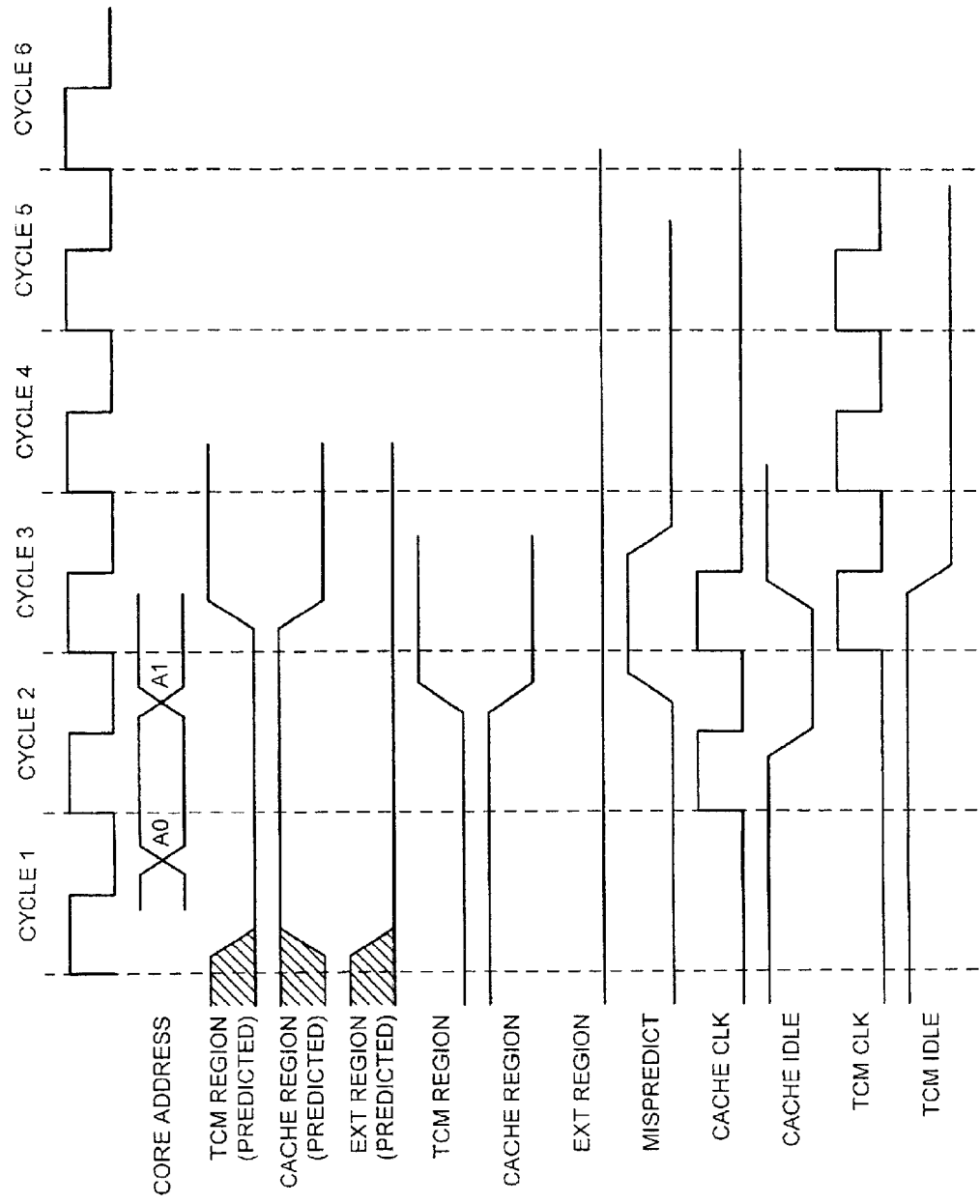
FIG. 6 is a timing diagram illustrating the interaction between various signals issued by the data processing apparatus of preferred embodiments.

The interaction between the various signals is illustrated schematically in FIG. 6, FIG. 6 being a timing diagram illustrating the described example of where prediction logic 210 predicts that the access should be performed by the cache 30, whereas in due course the attribute generation logic 200 confirms that the access should be performed by the TCM 20. As can be seen from FIG. 6, in cycle 1 an address $A_0$ is set, and in the same cycle predicted TCM region, cache region and external region attributes are issued by the prediction logic 210. In this example, the prediction logic predicts that the cache should be accessed, and accordingly the predicted cache region attribute is set to a logic one value. As discussed earlier with reference to FIG. 5, this will cause the cache clock signal to be driven in cycle 2 and for the cache idle signal to move to a logic zero value at the start of cycle 2. In the example of FIG. 6, it has been assumed that the cache has not been driven prior to this time. However, it will be appreciated that there is no requirement for this, and alternatively the cache clock may already be active, and the cache idle signal already in the logic zero state prior to the beginning of cycle 2.

During cycle 2, the actual TCM region, cache region and external region attributes are produced by the attribute generation logic 200, in this example the TCM region attribute transitioning to a logic one value, whilst the cache region attribute transitions to a logic zero value. Furthermore, the external region attribute is maintained at a logic zero value. As soon as these attributes are available, the checking logic 220 will perform the earlier described check, in this case resulting in the mispredict signal transitioning to a logic one value.

As illustrated earlier with reference to FIG. 5, the presence of the set mispredict signal, and the set TCM region attribute during cycle 2 will cause the TCM to be clocked from cycle 3 onwards, and for the TCM idle signal to be driven to the logic zero state.

Also in cycle 3, the predicted TCM region, cache region and external region attributes will be repredicted based on the actual TCM region, cache region and external region attributes from cycle 2. Accordingly, the predicted cache region attribute will transition from a logic one to a logic zero value, and the cache idle signal will return to a logic one value. As a result of this, the cache will stop being clocked after cycle 3.

FIG. 6 illustrates that in the above example of a misprediction, there is a one cycle hit in performance, since clocking of the TCM is delayed by one cycle as a result of the misprediction. Nevertheless, on the assumption that the misprediction occurs relatively infrequently, it can be seen that significant power savings can be realised without adversely affecting performance. Indeed, the performance is entirely unchanged in all cases where the prediction proves correct, whilst in such situations the power saving is obtained each time by avoiding the requirement to clock memory units speculatively.

Accordingly, it can be seen that the preferred embodiment of the present invention is a particularly useful mechanism for enabling high performance access requests to be realised in implementations where power saving is a significant concern.

Although a particular embodiment of the invention has been described herewith, it will be apparent that the invention is not limited thereto, and that many modifications and additions may be made within the scope of the invention. For example, various combinations of the features of the following dependent claims could be made with the features of the independent claims without departing from the scope of the present invention.

We claim:

1. A data processing apparatus, comprising:
   a plurality of memory units for storing data values;
   a processor core for issuing an access request specifying an access to be made to the memory units in relation to a data value;
   a memory controller for performing the access specified by the access request;
   attribute generation logic for determining from the access request one or more predetermined attributes verifying which of the memory units should be used when performing the access;
   prediction logic for predicting the one or more predetermined attributes;
   clock generation logic responsive to the predicted predetermined attributes from the prediction logic to select which one of the memory units is to be clocked during performance of the access, and to issue a clock signal to that memory unit;
   checking logic for determining whether the predetermined attributes generated by the attribute generation logic agree with the predicted predetermined attributes, and if not, for reinitiating the access, in which event the clock generation logic is arranged to reselect one of the memory units using the predetermined attributes as determined by the attribute generation logic.

2. A data processing apparatus as claimed in claim 1, wherein the memory controller comprises a plurality of memory controllers, each memory controller being associated with a different memory unit, and the clock generation logic is arranged to clock the selected memory unit and its associated memory controller during performance of the access.

3. A data processing apparatus as claimed in claim 1, wherein the access request specifies an address relating to the data value, and the attribute generation logic is arranged to determine the predetermined attributes dependent on the address.

4. A data processing apparatus as claimed in claim 1, wherein a first memory unit is tightly coupled memory for storing data values to which the processor core requires deterministic access.

5. A data processing apparatus as claimed in claim 4, wherein a second memory unit is a cache.

6. A data processing apparatus as claimed in claim 1, wherein the attribute generation logic is contained within a memory management unit arranged to generate for each access request a number of attributes including the predetermined attributes.

7. A data processing apparatus as claimed in claim 6, wherein the memory management unit comprises a table lookaside buffer for comparing an address specified by the access request with predetermined addresses in the table lookaside buffer, for each predetermined address the table lookaside buffer containing the number of attributes.

8. A data processing apparatus as claimed in claim 1, wherein the checking logic is arranged to generate a mispredict signal if the predetermined attributes do not agree with the predicted predetermined attributes, and the clock generation logic comprises clock signal gating circuitry for each memory unit, each clock signal gating circuitry receiving a system clock signal and outputting that system clock signal to the associated memory unit if either the predicted predetermined attributes indicate that the associated memory unit should be used for the access, or the mispredict signal is generated and the actual predetermined attributes generated by the attribute generation logic indicate that the associated memory unit should be used for the access.

9. A data processing apparatus as claimed in claim 1, wherein the prediction logic is arranged to base the predicted predetermined attributes for a current access request on the actual predetermined attributes generated by the attribute generation logic for a preceding access request.

10. A method of accessing memory units in a data processing apparatus, the data processing apparatus comprising a plurality of memory units for storing data values, a processor core for issuing an access request specifying an access to be made to the memory units in relation to a data value, and a memory controller for performing the access specified by the access request the method comprising the steps of:

a) determining from the access request one or more predetermined attributes verifying which of the memory units should be used when performing the access;

b) prior to completion of said step (a), performing the steps of:

(i) predicting the one or more predetermined attributes;

(ii) responsive to the predicted predetermined attributes generated at said step (b)(i), selecting which one of the memory units is to be clocked during performance of the access;

(iii) issuing a clock signal to the memory unit selected at said step (b)(ii); and (iv) causing the memory controller to perform the access;

c) once the determination at said step (a) is completed, determining whether the predetermined attributes generated at said step (a) agree with the predicted predetermined attributes generated at said step (b)(i), and if not, reinitiating the access, in which event one of the memory units is selected using the predetermined attributes determined at said step (a), a clock signal is issued to that memory unit, and the memory controller then reperforms the access.

\* \* \* \* \*